United States Patent [19]
Andrieux et al.

[11] Patent Number: 4,801,314
[45] Date of Patent: Jan. 31, 1989

[54] DEAERATOR FOR THE FEED WATER TO A STEAM GENERATOR

[75] Inventors: Bernard Andrieux, Boulogne; Claude Grand, Levallois-Perret, both of France

[73] Assignee: Delas, Levallois-Perret, France

[21] Appl. No.: 176,505

[22] Filed: Apr. 1, 1988

[30] Foreign Application Priority Data

Apr. 3, 1987 [FR] France .................. 87 04692

[51] Int. Cl.⁴ ............................................. B01D 47/02
[52] U.S. Cl. ..................................................... 55/198
[58] Field of Search ...................... 55/39, 53, 196, 198; 122/441, 442, 443, 488, 489

[56] References Cited

U.S. PATENT DOCUMENTS

| | | | |
|---|---|---|---|
| 1,636,361 | 7/1927 | Gibson | 55/198 |
| 2,671,524 | 3/1954 | Gilwood | 55/39 |
| 3,291,105 | 12/1966 | Stenard | 55/198 |
| 4,624,686 | 11/1986 | Andrieux et al. | 55/53 |

FOREIGN PATENT DOCUMENTS

1040311 10/1953 France .

*Primary Examiner*—Bernard Nozick
*Attorney, Agent, or Firm*—Sughrue, Mion, Zinn, Macpeak & Seas

[57] ABSTRACT

A deaerator for deaerating the feed water to a steam generator, the deaerator comprising a single enclosure (1) including a deaerating device, said enclosure being divided into two longitudinal zones (A, B) with a first one of said zones (A) corresponding to the location of said deaerating device, said first zone (A) having a cross-section which is larger in area than the cross-section of the other or second one of said zones (B), the center of gravity (G1) of said cross-section of said first zone being higher than the center of gravity (G2) of the cross-seciton of said second zone, the top portion of said first zone being provided with escape orifices (15) for the incondensable, nozzles (17) for spraying the water to be deaerated and reheated, and a reheating steam inlet (14) leading to a steam distribution chest (16) for distributing steam into longitudinal passages (28, 29) situated in an elongatge box (24) suspended from the walls of said first zone (A) of the enclosure, said box (24) being fed in a central longitudinal alley (23) with water from said nozzles (17), said water entering said passages (28, 29) situated on either side of said alley (23) via bottom orifices (30, 31) through the walls (26, 27) of said passages, the water and the steam then passing from said passages (28, 29) into outside alleys (36, 37) via perforated walls (32, 33) causing the water and the steam to mix in said outside alleys, said mixture finally pouring into the enclosure over the entire length of the longitudinal edges (38, 39) of the box (24).

5 Claims, 5 Drawing Sheets

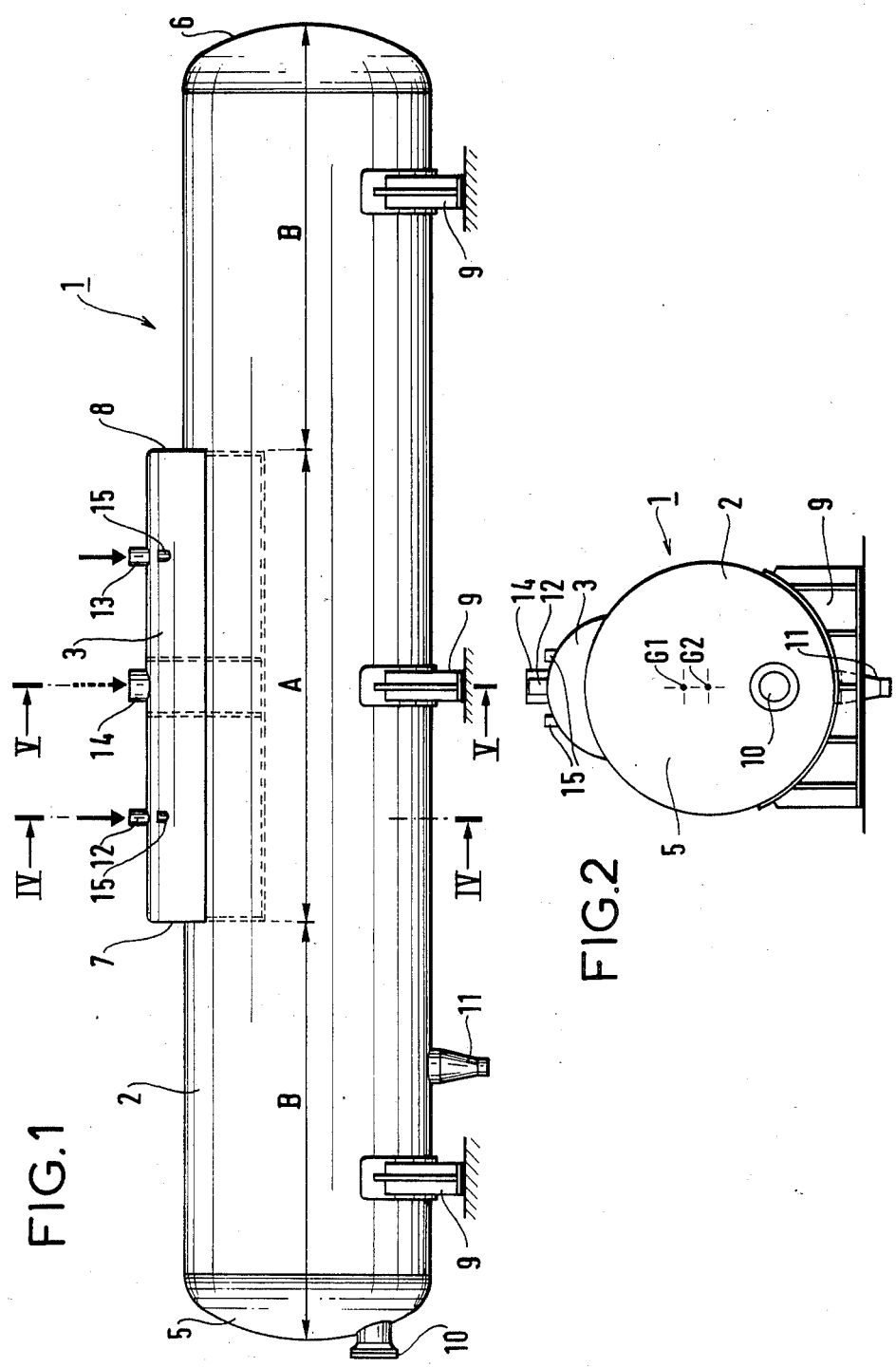

DEAERATOR FOR THE FEED WATER TO A STEAM GENERATOR

The present invention relates to a deaerator for the feed water to a steam generator.

BACKGROUND OF THE INVENTION

The feed water supplied to steam generators in electricity power stations must be suitably heated and must contain a very small quantity of dissolved oxygen. Thus, it is common practice to use an apparatus called a deaerator which is fed with water extracted from the condenser via low pressure reheaters and which performs the following three functions in particular;
- it deaerates and reheats the water, said function being provided by steam bled from the turbine;
- it stores the deaerated water in a large sized container, thereby enabling fluctuations in circuit throughput to be absorbed; and
- it feeds the feed pumps with sufficient head at any operating regime.

As a result, the apparatus is placed fairly high in the machine room.

There are two main implentations of deaerators in which deaeration is obtained by reheating the liquid to be deaerated.

When a volume of liquid is in equilibrium with its own vapor and with incondensable gases, the quantity of incondensables dissolved in the liquid is proportional to a coefficient of solubility for the incondensables in the liquid and to the partial pressure of the incondensables in the total gas phase (i.e. vapor and incondensables) which is in contact with the liquid. Thus, if the mass of liquid is at a temperature for which it saturated vapor pressure is exactly equal to the total pressure (vapor and incondensables) occupying the gas phase above the liquid, and if said total pressure remains constant, then the partial pressure of the incondensables will by zero and so the quantity of incondensables dissolved in the liquid will also be zero. In order to achieve this, it is clearly necessary for the total pressure to remain constant and for means to be provided to allow the incondensables to escape from the device enclosure. The mass of liquid must therefore be raised to the saturation temperature which corresponds to the pressure occupying the enclosure above the liquid.

In a first known implementation that applies this principle, the mass of water is contained in a single enclosure. An inlet is provided above the liquid surface for reheat steam which may be saturated or superheated, and which is free from incondensables, said steam being injected into the mass of water via dip pipes having holes at their bottom ends, with water to be deaerated being injected from above via a spray nozzle and with a incondensables being removed in the vicinity of said nozzle into an enclosure at a lower pressure than the pressure in the deaerator. See French Pat. No. 2,176,157, for example.

In a second known implementation, the apparatus comprises two separate enclosures, both of which are subjected to steam pressure, with one constituting the storage tank and with the other, upper enclosure, constituting the deaerator per se. These enclosures are connected to each other via pipe work for removing water and bringing steam into equilibrium. Incondensable-free reheat steam is applied to the upper enclosure and is conveyed to the inlet spray nozzles for the water to be deaerated. The assembly includes bubble (or scrubber) chambers and perforated trays. The incondensables are removed from the vicinity of the water inlet nozzles. The assembly also includes a device for distributing the reheated and deaerated water within the mass in the storage tank.

The main drawback of the first known implementation lies in the fact that more or less sudden drop in steam pressure causes the liquid to rise up the dip pipes into the manifolds feeding them, thereby reverse feeding the steam source. If the steam is bled from a turbine, the turbine may be severely damaged. Non-return valves are installed in order to avoid this danger, but they are not completely secure. In addition, the waer is heated by less than can be achieved by the second implementation, because of the steam head loss in the manifolds and the pipe work, and the head of water to be overcome. Several tenths of °C. are thus lost, thereby reducing the efficiency of the intallation. Further, the manifolds and the pipework which are often fed with superheated steam are difficult to design and are easily damaged in operation.

In the second implementation, this drawback is avoided, however having two distinct enclosures with different functions gives rise to very considerable bulk and the weight is generally greater too, since both of the enclosures are designed to withstand the reheat steam pressure. Cost is high and on-site assembly is relatively complex since both the storage container made of one or more items and the deaeration enclosure must be conveyed separately to the site and then installed relatively high up by means of cranes.

Proposals have been made in French patent document FR-A-No. 2,573,320 for a deaerating device to be installed in a single envelope, and to comprise a series of perforated trays receiving the water to be deaerated and spreading the liquid which falls into a central box having perforated pipework passing therethrough and supplied with bled-off steam, with the box including overflows via which a mixture of water and steam escapes in the form of an emulsion.

This device is particularly advantageous when installed in a condenser well, and thus at low pressure (less than 100 mb), however when it is installed in a separate enclosure, the supply of water is relatively small or else the diameter and/or length of the device and thus its bulk must be considerably increased, thereby directly opposing the desired aim. Further, the assembly comprising the deaerating device is relatively expensive and complicated since it includes a plurality of trays, ducts having expansion diaphgrams, pouring spouts, . . . .

The object of the present invention is to provide a deaerator which, for a supply of water similar to that provided by a deaerator of the type having dip tubes, includes a deaeration system of the same type as the second above-mentioned implementation, thus avoiding having dip tubes and being as small in volume and as light in weight as possible for a deaeration system of this type, i.e. close to the corresponding values of a deaerator using dip tubes.

SUMMARY OF THE INVENTION

The present invention thus provides a deaerator for deaerating the feed water to a steam generator, the deaerator comprising a single enclosure including a deaerating device, wherein said enclosure is divided into two longitudinal zones with a first one of said zones corresponding to the location of said deaerating device, said first zone having a cross-section which is larger in area than the cross-section of the other or second one of said zones, the center of gravity of said cross-section of said first zone being higher than the center of gravity of the cross-section of said second zone, the top portion of said first zone being provided with escape orifices for the incondensables, nozzles for spraying the water to be deaerated and reheated, and a reheating steam inlet leading to a steam distribution chest for distributing steam into longitudinal passages situated in an elongate box suspended from the walls of said first zone of the enclosure, said box being fed in a central longitudinal alley with water from said nozzles, said water entering said passages situated on either side of said alley via bottom orifices through the walls of said passages, the water and the steam then passing from said passages into outside alleys via perforated walls causing the water and the steam to mix in said outside alleys, said mixture finally pouring into the enclosure over the entire length of the longitudinal edges of the box.

In a first embodiment, said second zone is split into two portions on either side of said first zone, said two zones constituting a single horizontal axis cylindrical storage container which is closed at both ends, with the central portion thereof having an elongate opening in its top portion with a dome-forming cylindrical barrel portion welded to the edges of said elongate opening, said barrel being of small diameter than said container, said first zone being consituted by said central portion having the barrel.

In a second embodiment, said second zone is split into two portions on either side of said first zone, with the two zones constituting a single storage container which is closed at both ends, said first zone being constituted by a first horizontal axis cylinder connected at its ends to the two portions of said second zone which is constituted by second and third coaxial and same diameter cylinders which are of smaller diameter than said first cylinder, with the bottom generator line of all three cylinders being substantially common.

BRIEF DESCRIPTION OF THE DRAWINGS

Embodiments of the invention are described by way of example with reference to the accompanying drawings, in which:

FIG. 1 is an elevation view of a deaerator in accordance with the invention;

FIG. 2 is a lefthand view of FIG. 1;

MORE DETAILED DESCRIPTION

Figure 3:
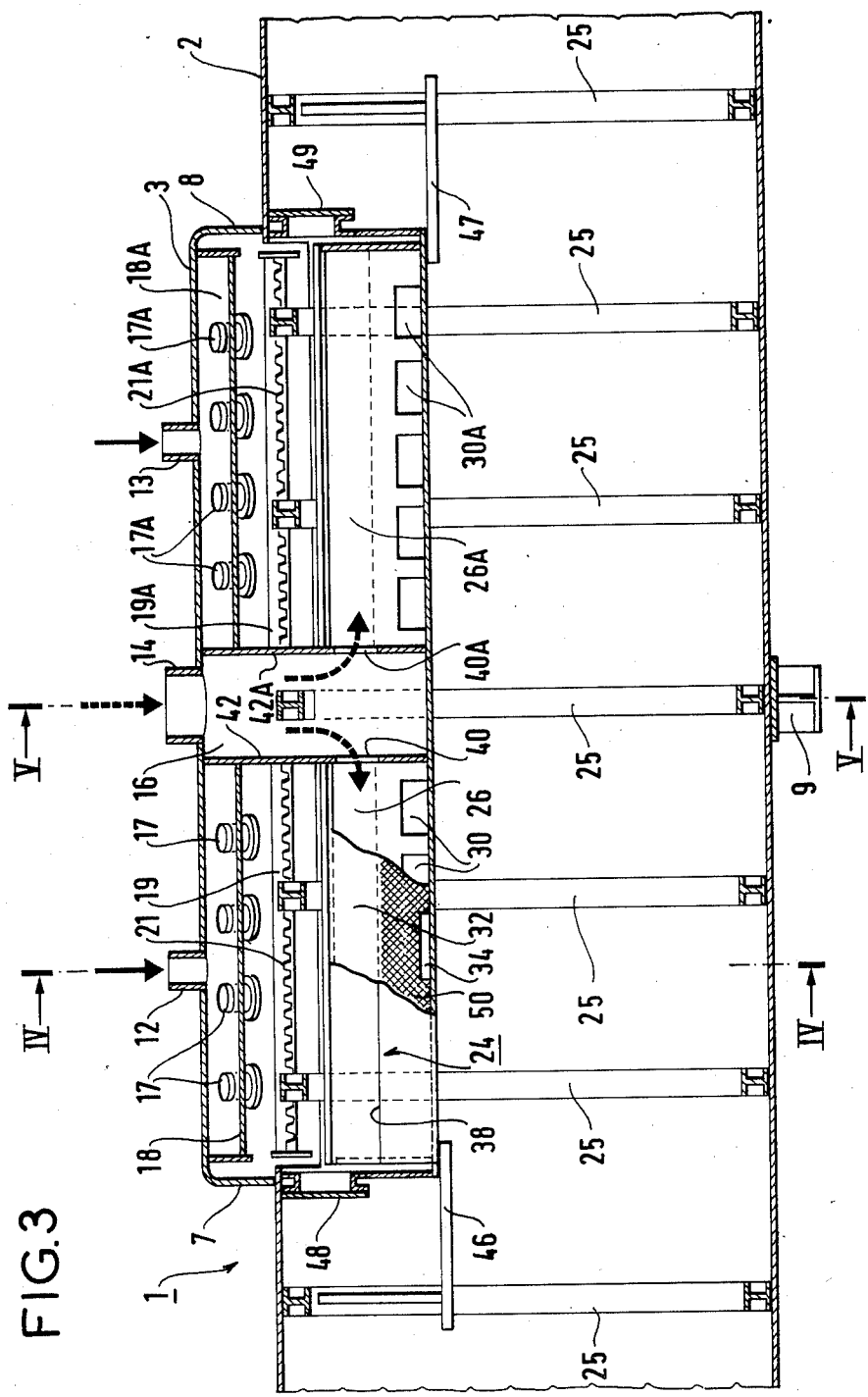
FIG. 3 is a fragmentary view on a larger scale of the FIG. 1 deaerator in axial section.

FIGS. 1 and 2 are thus an elevation and a lefthand end view of a deaerator for the feed water to a steam generator in a power station.

This deaerator comprises a single enclosure 1 constituted by a horizontal axis cylinder container 2 for storing deaerated water, and a dome-forming cylindrical barrel portion 3 which is welded via flat linking strips 4 (see FIGS. 4 and 5) to the edges of an elongate opening provided in the top portion of the container 2.

The container 2 is closed by rounded end pieces 5 and 6 and the barrel 3 is closed by flat end pieces 7 and 8, thereby constituting a closed envelope or enclosure 1.

This enclosure 1 is divided into two longitudinal zones: a central first zone A including the barrel 3, and a second zone B which is split into two portions on either end of the first zone. As can easily be seen in FIGS. 1 and 2, a cross-section through the first zone A is of greater area than a cross-section through the second zone B. In addition, the center of gravity G1 of a cross-section through the first zone A is upwardly offset relative to the center of gravity G2 of a cross-section through the second zone B.

The diameter of the barrel 3 is less than the diameter of the container 2 and the portion of the barrel which is present has a maximum chord extent which is less than its diameter.

The deaerator assembly is supported on supports 9. The deaerated water storage container 2 includes a manhole 10 for container inspection, and an outlet 11 for connection to an extraction duct.

The top portion of the barrel 3 has two openings 12 and 13 for feeding the deaerator with water to be deaerated, and an opening 14 for feeding the device with steam bled from a turbine and intended for reheating and deaering the water to be treated.

The barrel 3 further includes orifices 15 for evaporating the incondensable gases.

Figure 4:
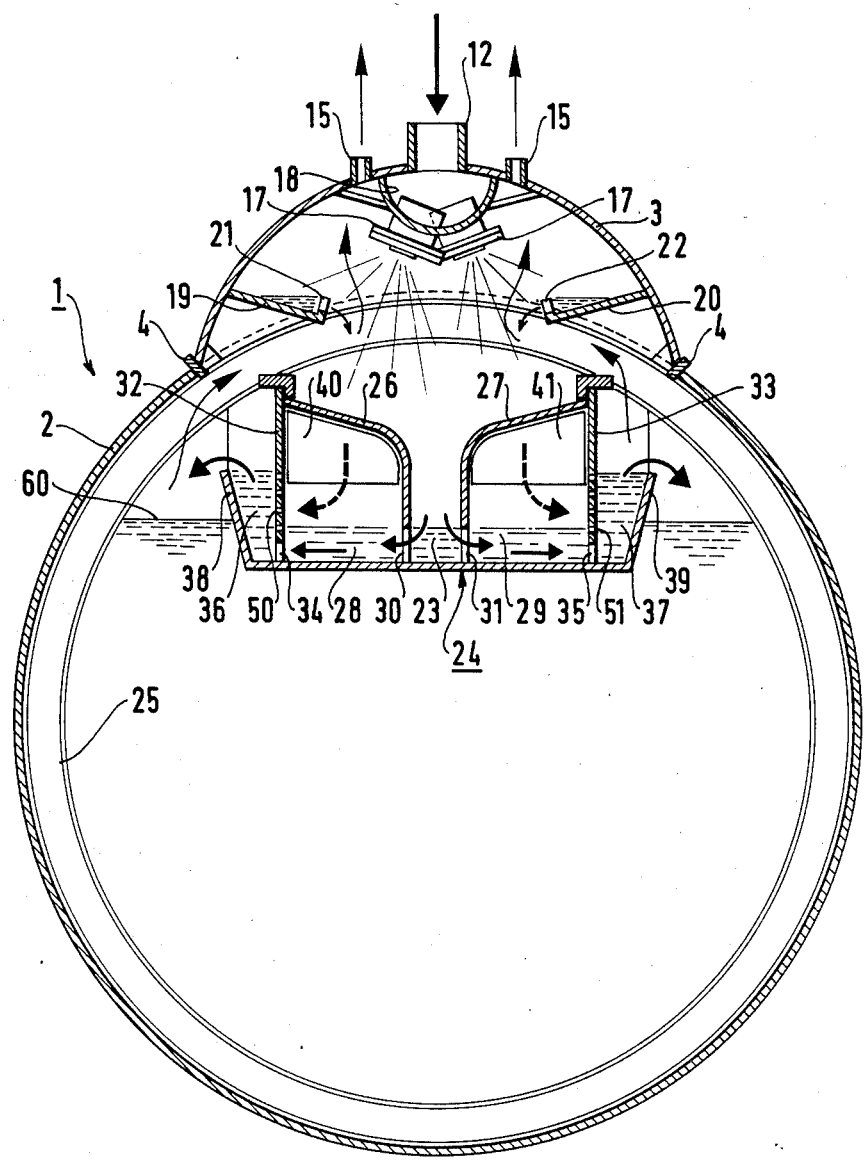
FIG. 4 is a section on IV—IV of FIG. 1 or FIG. 3.
Figure 5:
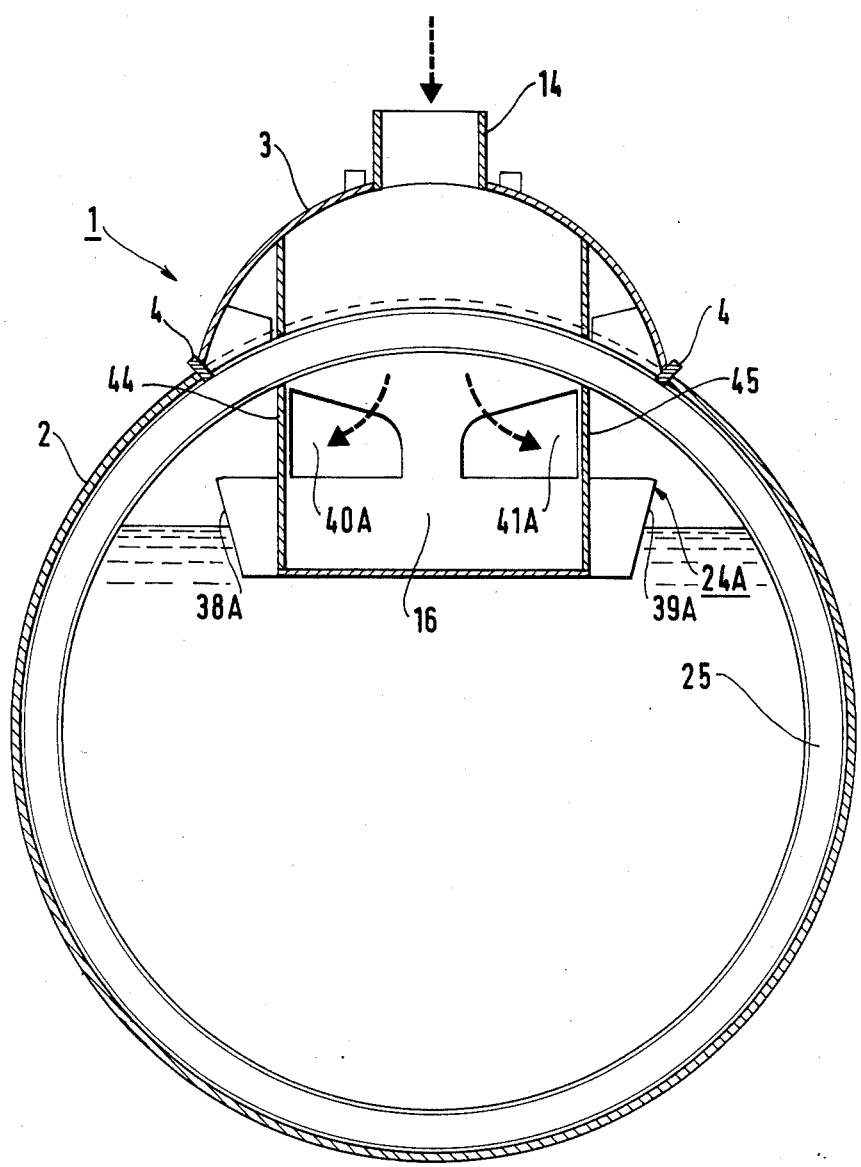
FIG. 5 is a section of V—V of FIG. 1 or FIG. 3.

Reference is now made to FIGS. 3, 4, and 5 for describing the inside of the deaerator.

The inside of the enclosure 1 is essentially constituted by a deaerator situated inside the barrel 3, and thus in the first zone, and in the top portion of the container 2 over the entire length of the barrel 3. The remainder of the enclosure, constituted by the major portion of the container 2 constitutes a supply 60 of deaerated water.

In fact, in the example described, the enclosure 1 comprises two identical deaerator devices situated respectively to the left and to the right of a common steam distribution chest 16.

In the drawing, equivalent items in the two deaerators have the same references, but the references relating to the deaerator device situated on the right of the common steam distribution chest 16 have an additional index A.

Each deaerator device comprises eight spray nozzles 17 situated at the top of the barrel 3 and fixed to a trough 18 into which the opening 12 opens out for supplying water to be deaerated (or 13 for the righthand deaerator). Two trays 19 and 20 having crenellated pouring edges 21 and 22 collect a portion of the water sprayed by the nozzles and constitute deflectors. The water coming directly from the nozzles or falling from the trays 19 and 20 ends up in a longitudinal central alley 23 of a sheet-metal box 24 supported by the dome 3 and by circular internal reinforcing ribs 25 of the enclosure. Two folded pieces of sheet metal 26 and 27 ensure that the water is collected in the central alley 23 and separate said central alley from two longitudinal side passages 28 and 29 situated on either side of the central alley. The side passages 28 and 29 are feed with water from the central alley 23 via bottom orifices 30 and 31 through the bases of the metal sheets 26 and 27 which serve as the walls of the passages 28 and 29. On the outside, i.e. on their sides furthest from the folded metal sheets 26 and 27, the passages 28 and 29 are delimited by sheet-metal outside walls 32 and 33 which are perforated over about the bottom half of their height, as can better be seen in the cut-away portion of FIG. 3. These outside walls 32 and 33 also include orifices 34 and 35 at their bases, which orifices are not tall. Beyond the side passages 28 and 29, the box 24 includes two further outside alleys 36 and 37 which are delimited on the outside by the longitudinal side walls 38 and 39 of the box 24 whose top edges form wiers.

The longitudinal side passages 28 and 29 are fed with reheating and deaerating steam from the common steam distribution chest 16 via openings 40 and 41 made through the walls 42 and 42A of the chest 16.

Gangways 46 and 47 are suspended from the reinforcing ribs 25 in order to give access to the deaerating devices which can be entered via manholes 48 and 49.

A certain number of reinforcing spacers (not shown in the figures in order to avoid spoiling the clarity of the drawings) ensure that the assembly remains rigid.

In the figures, thick continuous line arrows represent the flow of water, whereas dashed line arrows represent the flow of steam. Thus, water enters into the deaerator via the openings 12 and 13 and is then sprayed by the nozzles 17 and falls into the central alley 23. Thereafter, it passes through the orifices 30 and 31 into the side passages 28 and 29 and thence into the outside alleys 36 and 37 via the orifices 34 and 35, while the stem situated within the side passages 28 and 29 passes into the outside alleys 36 and 37 via the holes 50 and 51 through the walls 32 and 33 made of perforated sheet, and then mixes with the water by bubbling through it. From the outside alleys 36 and 37, the mixture pours into the storage container 2 over the top edges 38 and 39 of the box 24. The incondensables leave via the orifices 15, as shown by continuous fine line arrows.

As can be seen in the figures, the level of water in the storage container may very well rise up to the side walls 38 and 39 of the box 24. However, it must not rise as far as the top edges of said walls.

Figures 6, 7:
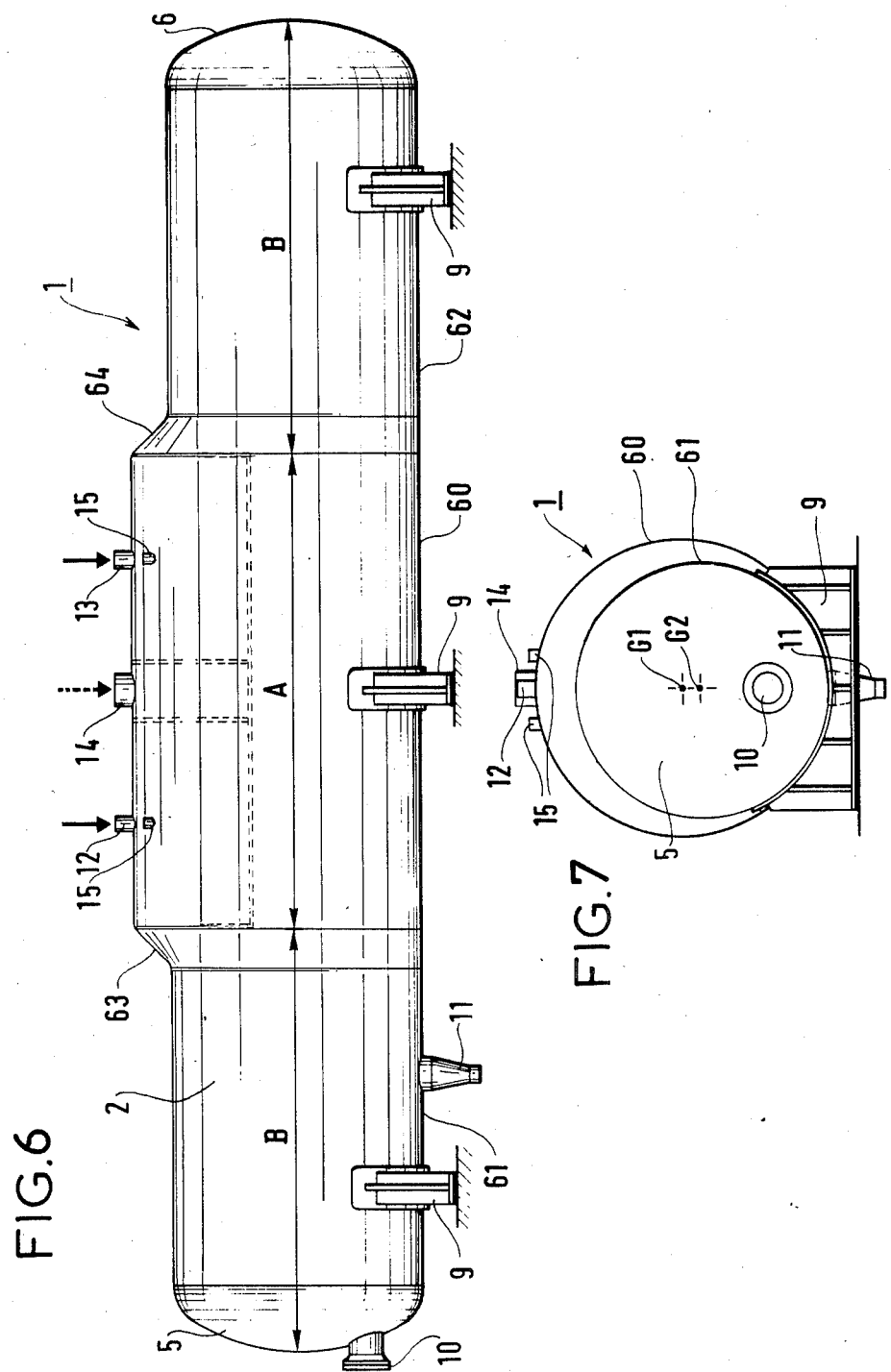
FIG. 6 is an elevation view of a preferred variant deaerator in accordance with the invention.
FIG. 7 is a lefthand view of FIG. 6.

FIGS. 6 and 7 show a variant of the invention. In this variant, the central first zone containing the deaerating device is constituted by a first horizontal axis cylinder 60 located between the two portions of the second zone formed respectively by a second cylinder 61 and a third cylinder 62. These second and third cylinders 61 and 62 have end pieces 5 and 6, are coaxial with each other, and have the same diameter. They are connected to the central cylinder 60 via welded connections 63 and 64. The central cylinder 60 in the first zone has a larger diameter than the cylinders 61 and 62 constituting the second zone. As can be seen in the figures, the bottom generator line of all three cylinders 60, 61, and 62 is common, with the axis of the center cylinder 60 being offset upwardly relative to the cylinders 61 and 62. The two zones taken together as constituted by the three cylinders constitute, as in the first example, a container 2 for storing deaerated water.

The deaerating device fixed to the top portion of the central cylinder 60 is identical to that described with reference to the preceding figures.

The advantage of this embodiment lies in the first zone being constituted by a full cylinder which does not include a longitudinal opening and which is therefore stronger and requires fewer reinforcing ribs 25.

It is also easier to manufacture and cheaper.

Thus, using a deaearator in accordance with the invention, it is possible within a single enclosure of substantially the same bulk and weight as the first prior art embodiment described in the introduction (for a given storage capacity of deaerated water) to separate the functions of deaerating the water and storing it, while ensuring that there is no possibility of the water backing into the turbine in the event of a drop in pressure of the steam feed to the deaerator due to a sudden drop in turbine load. The distribution of the water in the container 2 does not require any special arrangements since the wier extends over the entire length of the edges 38 and 39 of the box 24.

By way of particular non-limiting example, there follows a numerically worked example of a particular deaerator in accordance with the invention.

The storage container 2 has a diameter of 3.80 meters (m) and a length of 20 m, giving a capacity of 210 $m^3$. It is made of 2 mm thick sheet steel.

The diameter of the dome 3 is 2.20 m, its length is 7 m, and its thickness is 22 mm.

In an embodiment as shown in FIGS. 5 and 6, the cylinder 60 has a diameter of 4.30 m, a length of 7 m, and a thickness of 25 mm. The cylinders 61 and 62 are 3.80 m in diameter, are each 6.50 m in length, and have a thickness of 22 mm.

| Water to be deaerated: | |
|---|---|
| throughput: | 1,200 metric tons (tonnes)/h |
| temperature: | 131° C. |
| oxygen content: | 2,000 ppb max. ppb = parts per $10^9$ |
| Deaerating steam bleed: | |
| pressure: | 7 bars absolute |
| temperature: | 340° C. |
| throughput corresponding to throughput of water to be deaerated: | 72 tonnes/h |
| Deaerated water: | |
| throughput: | 1,272 tonnes/h |
| temperature: | 165° C. (i.e. the saturation temperature of steam at 7 bars absolute) |
| oxygen content: | less than 3 ppb |

The usable capacity of the container is 175 $m^3$.

We claim:

1. A deaerator for deaerating the feed water to a steam generator, the deaerator comprising a single enclosure including a deaerating device, wherein said enclosure is divided into two longitudinal zones with a first one of said zones corresponding to the location of said deaerating device, said first zone having a cross-section which is larger in area than the cross-section of the other or second one of said zones, the center of gravity of said cross-section of said first zone being higher than the center of gravity of the cross-section of said second zone, the top portion of said first zone being provided with escape orifices for the incondensables, nozzles for spraying the water to be deaerated and reheated, and a reheating steam inlet, a steam distribution chest for distributing steam, longitudinal passages situated in an elongate box suspended from the walls of said first zone of the enclosure, said box having longitudinal edges and a central longitudinal alley for receiving water from said nozzles, said passages being situated on either side of said alley and having bottom orifices through walls of said passages, the box having outside alleys with perforated walls wherein the water and the steam then passing from said passages into the outside alleys via the perforated walls causing the water and the steam to mix in said outside alleys, said mixture finally pouring into the enclosure over the entire length of the longitudinal edges of the box.

2. A deaerator according to claim 1, wherein said second zone is split into two portions on either side of said first zone, said two zones constituting a single horizontal axis cylindrical storage container which is closed at both ends, with the central portion thereof having an elongate opening in its top portion with a dome-forming cylindrical barrel portion welded to the edges of said elongate opening, said barrel being of smaller diameter than said container, said first zone being constituted by said central portion having the barrel.

3. A deaerator according to claim 1, wherein said second zone is split into two portions on either side of said first zone, with the two zones constituting a single storage container whichis closed at both ends, said first zone being constituted by a first horizontal axis cylinder connected at its ends to the two portions of said second zone which is constituted by second and third coaxial and same diameter cylinders which are of smaller diameter than said first cylinder, with the bottom generator line of all three cylinders being substantially common.

4. A deaerator according to claim 1, wherein the deaeration device is split into two parts situated on either side of said steam distribution chest.

5. A deaerator according to claim 1, wherein the box is suspended from circular internal reinforcing ribs of the enclosure.

* * * * *